United States Patent
Chen et al.

(10) Patent No.: US 9,973,537 B2
(45) Date of Patent: May 15, 2018

(54) METHOD AND SYSTEM FOR UPDATING SECURITY INFORMATION

(71) Applicant: Fonestock Technology Inc., Taipei (TW)

(72) Inventors: Albert Chu Tsung Chen, Taipei (TW); Jun Yih Lee, Kaohsiung (TW); Pi Ping Wei, Taipei (TW)

(73) Assignee: Fonestock Technology Inc. (TW)

( * ) Notice: Subject to any disclaimer, the term of this patent is extended or adjusted under 35 U.S.C. 154(b) by 348 days.

(21) Appl. No.: 14/952,096

(22) Filed: Nov. 25, 2015

(65) Prior Publication Data
US 2016/0277404 A1    Sep. 22, 2016

(30) Foreign Application Priority Data

Mar. 20, 2015   (TW) ................................ 104108990

(51) Int. Cl.
*H04L 29/06* (2006.01)
*H04W 12/00* (2009.01)
*H04W 40/24* (2009.01)

(52) U.S. Cl.
CPC ............ *H04L 63/20* (2013.01); *H04W 12/00* (2013.01); *H04W 40/24* (2013.01); *H04W 40/248* (2013.01); *H04L 63/00* (2013.01)

(58) Field of Classification Search
None
See application file for complete search history.

(56) References Cited

U.S. PATENT DOCUMENTS

2007/0294496 A1*  12/2007  Goss ................... G06F 12/1408
                                            711/163

* cited by examiner

*Primary Examiner* — Azizul Choudhury

(57) ABSTRACT

A method for updating security information is applied to a system including an information service provider and mobile devices. The information service provider includes a server and a database, in which the server provides security information to the mobile devices and each of the security information is related individually to a security code. The information service provider can transmit updated security information to the mobile devices in an active-push manner in communicative off-peak hours, and at the same time each of the mobile devices would be automatically waken up and connected with the service-provider so as to receive the updated security information. While the mobile device is to request additional information, the passive-pull transmission manner can then be applied by the mobile device to obtain the additional information from the information service provider. Thus, merits of both the active push transmission and the passive pull transmission can be obtained.

8 Claims, 2 Drawing Sheets

METHOD AND SYSTEM FOR UPDATING SECURITY INFORMATION

This application claims the benefit of Taiwan Patent Application Serial No. 104108990, filed Mar. 20, 2015, the subject matter of which is incorporated herein by reference.

BACKGROUND OF INVENTION

1. Field of the Invention

The invention relates to a method and system for updating security information, and more particularly to the method and system for updating security information that integrates merits from information transmission patterns of active push and passive pull.

2. Description of the Prior Art

As the information technology rapidly grows, convenience and speed in accessing the information are two of major progress in this industry. Versatile portable wireless communication apparatuses are merged into this trend to provide people convenience and many demands in ordinary life. For example, those portable wireless communication apparatuses include various handheld devices (such as mobile phones and cellular phones), smart phones, stock trackers, personal digital assistants with communication functions, notebook or tablet computers with wireless communication functions, and the like.

Except for the aforesaid hardware for various wireless communication apparatuses, plenty of software in pairing and executing those hardware are also developed in favor of users' convenience, real-time application and portability in financial investments, jobs, entertainments, information accessing and so on. A typical example in the financial investments is the electronic trading of securities (including stocks, bonds and futures) through wireless communication apparatuses. Appropriate wireless communication apparatuses for electronically trading the securities can perform electronic order placing and also provide real-time trading information in the securities market, such that the user may sort from the huge information sea of the securities and can thereby perform the optimal timing for buying or selling a target security or securities.

Regarding current service and transmission resorts for the trading securities, the cloud technology provides one of excellent solutions. The securities information providers forward, in a wireless communication manner, real-time trading information, historical trading information, some other news information and the like of specific securities to users of portable wireless communication devices, and further provide calculated or statistical data of the specific securities after performing computations of preset mathematical algorithms upon the aforesaid real-time trading information and historical trading information of these specific securities so as to generate useful reference data for the users to judge the best timing and pricing for trading the securities. In the art, such reference data may include, but not limited to, various technical charts related to the securities. According to the art, as long as any updated security information is located, the security information providers would transmit the information in an active push manner to each on-line subscriber/user. Alternatively, the security information providers may also base on the request from a portable wireless communication device of the user to transmit the related security information to the specific user. However, since a large number of the users may be on-line at the same time for the security-related information providing service; for example, during the trading time of the stock exchange, especially during the rush hours, one from a half hour before the open to an hour after the open, and another from an hour before the close to a half hour after the close. If some ordinary information that does not require an urgent update is pushed at these rush hours (the ordinary information includes company's financial statement, the meeting date of company's shareholders, the internal shareholding meeting, and some historical information), a huge bandwidths of wireless communication would be occupied and thus degrade the already-terrible communication quality. On the other hand, if majority of the information is transmitted through pulling, system's loading of the security information providers may be increased, and also the plenty pulling requests from the portable wireless communication devices would inevitably occupy the bandwidths of wireless communications. Similarly, the communication quality would be further made worse.

SUMMARY OF THE INVENTION

Accordingly, it is the primary object of the present invention to provide a method and system for updating security information that integrates merits from information transmission patterns of active push and passive pull. The service-provider for the security information can transmit the updated security information to each of users' mobile devices in an active-push manner while in an off-peak time of the wireless communication, and at the same time each of the mobile devices would be automatically waken up and connected with the service-provider so as to receive these updated security information. Such an active-push transmission manner is particularly applicable to transmit the historical information that is not urgently needed to all the users. While a specific user operates his/her mobile device to request additional information, the passive-pull transmission manner can then be applied by the mobile device to obtain the additional information from the service-provider. Thereby, transmission for updating non-urgent security information during rush hours can thus be avoided. Also, frequent pulling of the updated security information from the service-provider by the mobile device can be substantially reduced, such that the quality of wireless communication and the system's loading of the service-provider can be greatly improved.

In the present invention, the method for updating security information is applied to an information service provider, and the information service provider includes a server and a database, in which the server provides at least one security information to at least one distant mobile device and each of the security information is related individually to a security code. The method for updating security information comprises the steps of:

Step (A): the server storing internally an information definition table, the information definition table including a plurality of information names, each of the information names being respectively related to an information code and an information-processing time contained in the information definition table, the information name being an information format of the security information, the information code being respectively related to a code number of the corresponding information name, the information-processing time indicating a download time to download the security information of the corresponding information name;

Step (B): according to the information definition table and within the download time indicated by the information-processing time in the information definition table, the server downloading the information name corresponding to the information-processing time or every said security information matching the information code from a foreign information source, then storing each of the downloaded security information into the database, and updating a plurality of information updating tables pre-stored in the database accordingly, wherein each the security code is correspondingly related to one of the information updating tables stored in the database, and each of the corresponding information updating tables records every said information code of the security information and a previous update time related to the corresponding security code;

Step (C): according to the plurality of information updating tables, the server generating an information-transmitting schedule accounting to the individual security code corresponding to each said updated security information, the information-transmitting schedule including a transmission time related to the security code, an information-starting date and an information-ending date related both to the corresponding information code; wherein a time duration between the information-starting date and the information-ending date is defined as a previous-updated period for the security information related to the information code of the security code; and Step (D): during the transmission time included in the information-transmitting schedule, the server transmitting the corresponding security information within the previous-updated period to each of the at least one mobile device connected with the server during the transmission time.

In one embodiment of the present invention, an application program is performed at the mobile device, a personal profolio is stored in the mobile device, the personal profolio includes at least one said security code configured by a user of the corresponding mobile device, the personal profolio is also stored in the database, and the security code contained in the personal profolio is further related individually to one of the information updating tables and one of the information-transmitting schedules stored in the mobile device; wherein:

in the Step (B), after the server updates any said information updating table of the security code, a comparison upon the personal profolio is performed between the server and each of the at least one mobile device so as to transmit the updated information updating table of the common security code to the respective mobile device; the application program performed at the mobile device then updates the corresponding information updating table stored in the mobile device accordingly;

in the Step (C), after the server generates the information-transmitting schedule of any said security code, a comparison upon the personal profolio is performed between the server and each of the at least one mobile device so as to transmit the updated information-transmitting schedule of the common security code to the respective mobile device; the application program performed at the mobile device then updates the corresponding information-transmitting schedule stored in the mobile device accordingly; and in the Step (D), during the transmission time, the application program performed at the mobile device bases on the information updating table and the information-transmitting schedule stored in the mobile device to establish automatically connection with the server so as to receive the security information from the server.

In one embodiment of the present invention when a user operates the mobile device to display a desired information, the application program performed at the mobile device bases on user's operations and the information updating table stored in the mobile device to determine if or not a connection with the server is needed to obtain a desired updated information; if the connection is needed, the connection being established so as to transmit an information-pulling request to the server; after the server receiving the information-pulling request from the mobile device, the related updated information being retrieved from the database and further transmitted to the mobile device; the mobile device storing the received updated information into a memory of the mobile device, displaying the desired information on the mobile device, and further updating the information updating table stored in the mobile device that is related to the updated information.

In one embodiment of the present invention the server includes a data collector (DC), a data scheduler (DL), a data disseminator (DD), a data cacher (DA), a memory cache (MC), a service server (SS) and a data puller (DP); wherein the data collector (DC) capable of connecting a foreign information source (data source, DS) is to collect various security information and further to process and transform into a predetermined format before being stored into the database (DB); wherein the database (DB) stores at least the security information; wherein, after reading and further processing information from the database (DB) at predetermined times, the data scheduler (DL) generates, then stores into the database (DB) and forwards to the related mobile device (MD) the related information updating tables and the related information-transmitting schedules; wherein the data disseminator (DD) bases on the information-transmitting schedules stored in the database (DB) by the data scheduler (DL) to read at predetermined times related information and then transmit the related information to the related user for following processing; wherein, after receiving the information from the data scheduler (DL) and the data disseminator (DD), the data cacher (DA) processes the information and then stores into the memory cache (MC); wherein the memory cache (MC) stores the information of the data cacher (DA) for further requirement in the data puller (DP); wherein the service server (SS) provides network connections and information transmissions related to various cloud-end service servers that provide updating service to the mobile device (MD); wherein, after analyzing an information-updating order from the service server (SS), the data puller (DP) obtains the security information for the mobile device (MD) from the memory cache (MC) and then transmits the security information back to the service server (SS) and further the mobile device (MD).

All these objects are achieved by the method and the system for updating security information described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a method and a system for updating security information. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

In the present invention, the method and the system for updating security information can successfully integrate merits from information transmission patterns of active push and passive pull. The service-provider for the security information can transmit the updated security information to each of users' mobile devices in an active-push manner while in an off-peak time of the wireless communication, and at the same time each of the mobile devices would be automatically waken up and connected with the service-provider so as to receive these updated security information. Such an active-push transmission manner is particularly applicable to transmit the historical information that is not urgently needed to all the users. While a specific user operates his/her mobile device to request additional information, the passive-pull transmission manner can then be applied by the mobile device to obtain the additional information from the service-provider. Thereby, transmission for updating non-urgent security information during rush hours can thus be avoided. Also, frequent pulling of the updated security information from the service-provider by the mobile device can be substantially reduced, such that the quality of wireless communication and the system's loading of the service-provider can be greatly improved.

Figure 1:
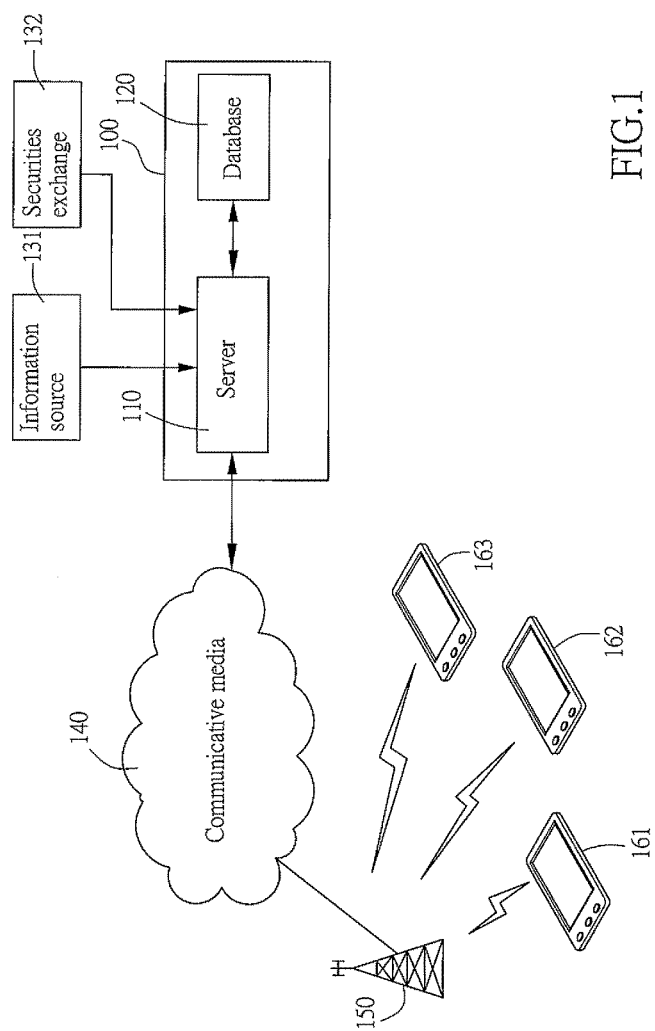
FIG. 1 is a schematic block diagram of an embodiment of the system for updating security information in accordance with the present invention.

Referring now to FIG. 1, a schematic block diagram of an embodiment of the system for updating security information in accordance with the present invention is shown. This embodiment of the system for updating security information includes at least one server 110, at least one database 120, an information source 131, a securities exchange 132, a communicative media 140, a wireless communication service system 150, and a plurality of user devices 161, 162, 163. The server 110 and the database 120 are integrated to form a service-provider 100 of the system for updating security information, in which the server 110 can receive a plurality of securities trading information from the information source 131 and the securities exchange 132, then perform necessary analysis upon the received securities trading information, and finally store necessary data into the database 120. The server 110 at the service-provider 100 can receive link requests from the plurality of user devices 161, 162, 163 through the communicative media 140 and the wireless communication service system 150 so as to establish the connection in between with the user devices 161, 162, 163 and thus further to allow the user devices 161, 162, 163 to receive service provided by the service-provider 100. In the present invention, the service provided by the service-provider 10 includes, but not limited to, download service of real-time trading information, historical trading information, statistic data, and/or any news information, finance/bearish information, main strength information, company's revenue information, company's financial statement information, stockholders meeting information, company's basic information, internal shareholding information, inventor conference information, integrated information related to the securities from the database 12 of the server 11. In the present invention, all the information and data related to the securities are called hereinafter the securities information.

The user devices 161, 162, 163, the server 110 of the service-provider 100 and the information sources 130 can be linked for a data transmission purpose through at least one communicative media 140 of the communicative service system 150. In this embodiment, the service-provider 100 is to provide information service related to the securities, such as, but not limited to, stocks, futures, warrants, funds, bonds and so on. The information source 131, as a data source or provider from which the server 110 of the service-provider 100 can retrieve the trading information of the securities including the historical and intraday data, can be, but not limited to, a stock exchange, a securities dealer, a bank, a news media, a TV or broadcast media, and any company the like. In addition, the server 110 of the service-provider 100 can retrieve the real-time securities trading information directly from the securities exchange 132, and the server 110 of the service-provider 100 can store the data into the database 120, in which these data may be the securities information retrieved from the information source 131 and the securities exchange 132. In the present invention, the communicative service system 150 can be, but not limited to, GSM850/900/1800/1900, CDMA, WCDMA, PHS, GPRS, WiMAX, LTE, and any communicative system he like. The mobile device 161, 162 or 163 can be, but not limited to, a stock-tracking machine with a touch screen, a PDA, a smart phone, a handheld electronic apparatus, a tablet computer with a touch screen, a notebook computer, and a desktop computer. The communicative media 140 can include at least one of a mobile phone communicative media, a wireless communicative network media, and an internet network media.

In the present invention, the method for updating security information can be applied to the information service provider 100 as shown in FIG. 1. The information service provider 100 includes the server 110 and the database 120. The server 110 can provide at least one security information to at least one distant mobile device 161, 162, 163 through the communicative media 140 provided by the communicative service system 150. Each of the security information is related to a security code. In this embodiment, the method for updating security information in accordance with the present invention includes the steps of:

Step (A): The server 110 stores internally an information definition table, the information definition table further includes a plurality of information names, and each of the information names is respectively related to an information code and an information-processing time contained in the information definition table. The information name is an information format of the security information, such as, but not limited to, a daily candle (K) line, a weekly K line, a juridical person (daily), a finance/bearish (daily), a main strength+(daily), a monthly revenue, a financial report, a stockholders meeting (yearly), a company's basic information, an internal shareholding, an inventor conference, or an auxiliary information (daily). The information code is referred to a code number (1, 2, 3 . . . , for example) of the corresponding information name. The information-processing time indicates a download time to download the security information of the corresponding information name (for example, but not limited to, a specific time or period in a trading day, or repeated but discrete download trial N for information yet to be downloaded). Referring the following Table 1, an embodiment of the information definition table in accordance with the present invention is shown.

TABLE 1

An embodiment of the information definition table
in accordance with the present invention

| Information name | Information code | Information-processing time |
|---|---|---|
| K line (daily) | 1 | 14:40 of the trading day, repeating N times for every 30 minutes |
| K line (weekly) | 2 | |
| . . . | . . . | |
| Juridical person (daily) | 5 | 15:30 of the trading day, repeating N times for every 30 minutes |
| Finance/Bearish (daily) | 8 | |
| Main strength + (daily) | 11 | |
| Monthly revenue | 12 | |
| Financial report | 13 | |
| . . . | . . . | |
| Stockholders meeting (yearly) | 21 | |
| Company's basic information | 22 | 20:00 of the trading day, every 30 minutes |
| Internal shareholding | 23 | |
| Inventor conference | 31 | |
| Auxiliary information (daily) | 32 | |

As shown in Table 1, contains of the column "Information-processing time" are only to be cited by the data collector of the server 110. Though each of the mobile devices 161, 162, 163 includes a built-in information definition table, yet the built-in information definition table includes only two columns: the information name and the information code; excluding the information-processing time.

Step (B): According to the information definition table and within the download time indicated by the information-processing time in the information definition table, the server 110 downloads the information name corresponding to the information-processing time or every said security information matching the information code from a foreign information source 131 (or stock exchange 132), then stores each of the downloaded security information into the database 120, and updates a plurality of information updating tables pre-stored in the database 120, accordingly. Each of the security codes is correspondingly related to one of the information updating tables stored in the database 120, and each of the corresponding information updating tables records every said information code of the security information and a previous update time related to the corresponding security code. Referring to Table 2, an embodiment of the information updating table in accordance with the present invention is shown.

TABLE 2

An embodiment of the information updating
table in accordance with the present invention
Security code/Stock code (2330)

| Information code | Update time |
|---|---|
| 1 | 20140701 |
| 2 | 20140705 |
| . . . | . . . |
| 5 | 20140701 |
| 8 | 20140701 |
| 11 | 20140701 |

TABLE 2-continued

An embodiment of the information updating
table in accordance with the present invention
Security code/Stock code (2330)

| Information code | Update time |
|---|---|
| 12 | 20140706 |
| 13 | 20140331 |
| . . . | . . . |
| 21 | 20140624 |
| 22 | 20140303 |
| 23 | 20140516 |
| 31 | 20140714 |
| 32 | 20140701 |

In addition, an application program (APP) is performed at the mobile device 161, 162 or 163, a personal profolio is stored in the corresponding mobile device 161, 162 or 163, the personal profolio includes at least one said security code configured by a user of the corresponding mobile device 161, 162 or 163, the personal profolio is also stored in the database 120 by the server 110, and the security code contained in the personal profolio is further related individually to one of the information updating tables and one of the information-transmitting schedules stored in the corresponding mobile device 161, 162 or 163.

Step (C): According to the plurality of information updating tables, the server 110 generates an information-transmitting schedule accounting to the individual security code corresponding to each of the updated security information. The information-transmitting schedule includes a transmission time related to the security code, an information-starting date and an information-ending date, both of which are related to the corresponding information code. A time duration between the information-starting date and the information-ending date is defined as a previous-updated period for the security information related to the information code of the security code. Referring to Table 3, an embodiment of the information-transmitting schedule in accordance with the present invention is shown.

TABLE 3

An embodiment of the information-transmitting
schedule in accordance with the present invention
Transmission time = 07110300~07110330

| Information code | Information-starting date | Information-ending date |
|---|---|---|
| 1 | 20140601 | 20140701 |
| 2 | 20140601 | 20140705 |
| . . . | . . . | . . . |
| 5 | 20140601 | 20140701 |
| 8 | 20140601 | 20140701 |
| 11 | 20140601 | 20140701 |
| 12 | 20140601 | 20140706 |
| 13 | 20130601 | 20140331 |
| . . . | . . . | . . . |
| 21 | 20140624 | 20140624 |
| 22 | 20140303 | 20140303 |
| 23 | 20140516 | 20140516 |
| 31 | 20140714 | 20140714 |
| 32 | 20140701 | 20140701 |

In a preferred embodiment of the present invention, in the Step (B), after the server 110 updates any said information updating table of the security code, a comparison upon the personal profolio is performed between the server 110 and each of the mobile devices 161, 162, 163 so as to transmit the updated information updating table of the common security code to the respective mobile devices 161, 162, 163. Then, the application program performed at the corresponding mobile device 161, 162, 163 would update the corresponding information updating table stored in the corresponding mobile device 161, 162, 163, accordingly. Further, in the Step (C), after the server generates the information-transmitting schedule of any said security code, a comparison upon the personal profolio is performed between the server 110 and each of the mobile devices 161, 162, 163 so as to transmit the updated information-transmitting schedule of the common security code to the respective mobile devices 161, 162, 163. Then, the application program performed at the corresponding mobile device 161, 162, 163 would update the corresponding information-transmitting schedule stored in the corresponding mobile device 161, 162, 163, accordingly.

Step (D): During the transmission time included in the information-transmitting schedule, the server 110 transmits, in a push transmission manner, the corresponding security information within the previous-updated period to each of the mobile devices 161, 162, 163 connected with the server 110 during the transmission time. In the Step (D), during the transmission time, the application program performed at the corresponding mobile device 161, 162, 163 would base on the information updating table and the information-transmitting schedule stored in the corresponding mobile device 161, 162, 163 to establish automatically connection with the server 110 so as to receive the security information from the server 110 in a push transmission manner. Namely, as long as any change of the security information in the column "Update time" of the information updating table in the server 100 is located, then the server 110 can perform push transmission to each of the mobile devices 161, 162, 163 connected with the server 110 at specific transmission times (generally, the off-peak hours, in the early morning for example) recorded in the information-transmitting schedule. In addition, in one preferred embodiment of the present invention, only the security information related to the security code recorded in the personal profolio would be pushed to the corresponding mobile device 161, 162, 163 related to the personal profolio. In operations, the application program performed at the mobile device 161, 162, 163 would base on the contents of the personal profolio to determine whether or not to wake up the mobile device 161, 162, 163 at specific transmission times and connect the waken mobile device 161, 162, 163 to the server 110 so as to receive the security information. If the application program finds that, during the specific transmission times, the transmitted information and the security code in the personal profolio are not correlated, then no waking of this mobile device 161, 162, 163 would not be performed.

In one embodiment of the method for updating security information in accordance with the present invention, when a user operates the mobile device 161, 162, 163 to display a desired information, the application program performed at the mobile device 161, 162, 163 would base on user's operations and the information updating table stored in the mobile device 161, 162, 163 to determine if or not a connection with the server 110 is needed to obtain a desired updated information. If the security information stored in the mobile device 161, 162, 163 is enough to meet the desired information, then the mobile device 161, 162, 163 will not perform the information pulling with the server 110. When the security information stored in the mobile device 161, 162, 163 can't meet the operation requirement for the desired information, then a information pulling with the server 110 shall be performed. At this time, the mobile device 161, 162, 163 would establish the connection (if required) and transmit an information-pulling request to the server 110. After the server 110 receives the information-pulling request from the mobile device 161, 162, 163, the server 110 would retrieve the related updated information from the database 120 and transmit to the mobile device 161, 162, 163 in a pull transmission manner. The mobile device 161, 162, 163 would store the received updated information into respective memory of the mobile device 161, 162, 163, display the desired information on the mobile device 161, 162, 163, and also update the information updating table related to the updated information in the mobile device 161, 162, 163. Upon such an arrangement, while in encountering another need of the information by any of the mobile devices 161, 162, 163, or while the server 110 needs to push the security information by performing aforesaid Step (A) to Step (D), then it is not necessary to re-perform the pulling or pushing upon the information.

Figure 2:
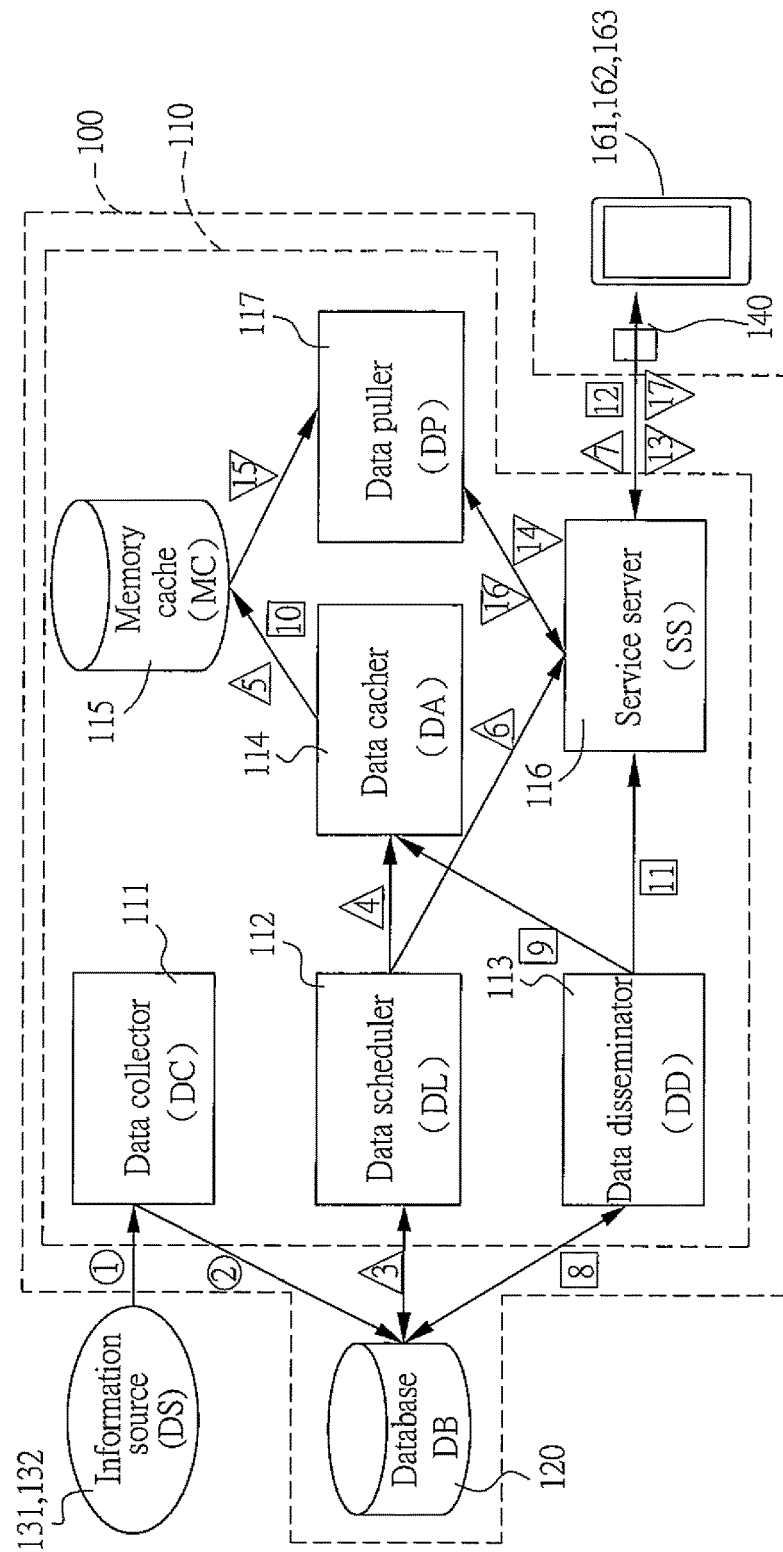
FIG. 2 is a schematic view showing module blocks and information flows of the server in the preferred system for updating security information in accordance with the present invention.

Referring now to FIG. 2, a schematic view of the module blocks and information flows of the server 110 in the preferred system for updating security information in accordance with the present invention is shown. As illustrated, the server 110 for the system for updating security information includes a data collector 111 (DC), a data scheduler 112 (DL), a data disseminator 113 (DD), a data cacher (DA) 114, a memory cache 115 (MC), a service server 116 (SS) and a data puller 117 (DP). The data collector 111 (DC) capable of connecting a foreign information source 131, 132 (data source, DS) through an internet is to collect various security-related information (security information) and further to process and transform into a predetermined format before being stored into the database 120 (DB). The database 120 (DB) is a permanent storage device for storing various transformed security information. The data scheduler 112 (DL) can read and further process the information from the database 120 (DB) at predetermined times, and then can generate various information-related "information updating table" and "information-transmitting schedule" to be further stored into the database 120 (DB). The information can then be multicasted to the downstream mobile devices (MD) through a feasible network for being utilized by the individual application programs of the mobile devices (MD). The data disseminator 113 (DD) bases on the information-transmitting schedules stored in the database 120 (DB) by the data scheduler 112 (DL) to read at predetermined times related information and then transmit through networking (multicast) the related information to the related user for further processing. The data cacher 114 (DA) can receive the information from the data scheduler 112 (DL) and the data disseminator 113 (DD), and also the data cacher (DA) processes then stores the information into the memory cache 115 (MC). The memory cache 115 (MC) can store the information of the data cacher 114 (DA) for further requirement in the data puller 117 (DP). The service server 116 (SS) provides network connections and information transmissions related to various cloud-end service servers that provide updating service to the mobile device (MD). The data puller 117 (DP) obtains the security information for the mobile device (MD) from the memory cache 115 (MC) and then transmits the security information back to the service server 116 (SS) and further the mobile device (MD).

In one embodiment of the present invention, these modules 111, 112, 113, 115, 116, 117 can be one or plural independent host servers or computer hardware. Namely, the server 110 can be consisted of several host servers, and the host servers can locate discretely but integrated through networking. In particular, in order to provide connection service to a large number of mobile devices 161, 162, 163, the number of the service servers 116 may be larger than that of any other module. However, in another embodiment of the present invention, these modules 111, 112, 113, 115, 116, 117 can also be synthesized functionally by computer software, and can be integrated into a single server 110.

Referring to FIG. 2, when the server 110 performs the transformation and storage (into the database 120) of the security information, the DC firstly provides the system to input the "information definition table" by reloading the "information definition table" after the program is started. Then, as the data flow number 1 of FIG. 2, within the predetermined time of the "information definition table" ND after the DS collects and downloads the predetermined security information through the internet, the DC transforms the security information into specific formats and stores these formats into the DB for further usage by the DD (data flow number 2). Further, the DC will base on the definitions of the "information code" of the "information definition table" to write the dates of the information into the "information updating table" of the server for further usage by the DL.

When the server 110 proceeds to generate the information updating table, the DL would check the DB for the information updating table of the market at predetermined time, and base on the information codes that have already been updated to generate individually new "information updating tables" respectively to all the individual stocks in the DB (namely based on the security codes related to the specific securities), and to store the "information updating tables" into the DB for further usage (data flow number 3). At the same time, the DL would multicast the updated "information updating table" of the aforesaid security code to the DA and the SS (data flow number 4, 6). The DA would store the updated "information updating table" of the security code into the MC for future usage (data flow number 5). Then, the SS would compare the updated "information updating table" of the security code with the information of the related security code in the personal profolio of the online MC, and transmit the updated "information updating table" of the common security code to the MD (data flow number 7). The application program in the MD would compare the updated "information updating table" with the existing "information updating table" already stored in the MD, and update the changes in between to the relevant information space so as to have the "information updating table" in the MD to be synchronized with the updated "information updating table".

When the server 110 proceeds to generate the information-transmitting schedule, the DL would check the DB for the information-transmitting schedule of the market at predetermined time, and base on the information codes that have already been updated to generate individually new "information-transmitting schedules" respectively to all the individual stocks in the DB (namely based on the security codes related to the specific securities), and to store the "information-transmitting schedules" into the DB for further usage (data flow number 3). At the same time, the DL would multicast the updated "information-transmitting schedule" of the aforesaid security code to the DA and the SS (data flow number 4, 6). The DA would store the updated "information-transmitting schedule" of the security code into the MC for future usage (data flow number 5). Then, the SS would compare the updated "information-transmitting schedule" of the security code with the information of the related security code in the personal profolio of the online MC, and transmit the updated "information-transmitting schedule" of the common security code to the MD (data flow number 7). The application program in the MD would compare the updated "information-transmitting schedule" with the existing "information-transmitting schedule" already stored in the MD, and update the changes in between to the relevant information space so as to have the "information-transmitting schedule" in the MD to be synchronized with the updated "information-transmitting schedule".

When the server 110 performs the information updating operation in a push transmission manner, the DD would base on the "information-transmitting schedule" in the DB to retrieve the security information required to be transmitted in that time period, and then multicast the security information to the DA and the SS (data flow number 9, 11). Then, the DA stores the security information transmitted from the DD into the MC for future usage (data flow number 10). On the other hand, the distant MD would base on its internal "information updating table" and the "information-transmitting schedule" to determine the timing to connect the SS for retrieve the required information. The SS would compare the security information transmitted from the DD with the information of the related security codes in the personal profolio of the online MD, and then transmit the security information of common security codes to the MD (data flow number 12). In the present invention, the updating operation by the server 110 upon the security-related historical information in a push transmission manner is performed according to the specific transmission times recorded in the "information-transmitting schedule" of each related security code. Hence, such an operation can be performed in the off-peak hours (around the midnight for example) to transmit in a push transmission manner a large amount of the information to a large number of the mobile devices. Also, based on different information codes, respective updating upon the security information of the related information codes can be performed individually. Further, the push transmission to the MDs can also be performed individually with respect to different locations of the MDs from corresponding SSs at relevant locations. Upon such an arrangement, the jammed bandwidths of wireless communication can be substantially relieved, and the system loading can be thus reduced.

When the server 110 accepts the request from the mobile device to perform the information updating operation in a pull transmission manner, the user firstly operates the MD to display the related information. Thus, the application program of the MD would base on user's command and the "information updating table" previously stored in the MD to determine whether or not a connection to the SS is needed for obtaining the required updated information (data flow number 13). While a pull transmission is needed to retrieve the information from the server 110, the MD would establish a network connection and transmit an information-pulling request to the SS, the SS would then base on the information-pulling request from the MD to generate an information updating command and forward the command to the DP for future processing (data flow number 14). Then, the DP would base on the MD's command transmitted from the SS to retrieve the related updated information from the MC (data flow number 15). The retrieved information is then transformed and transmitted to the SS in a required packet format for the MD (data flow number 16). Thereafter, the SS would pack further and transmit the packet-format information from the DP to the MD (data flow number 17). Then, after the MD receives and then analyzes the related updated information from the SS, the information would be stored into the memory of the MD, and also displayed to the user of the MD. At the same time, the MD would synchronize the internal "information updating table" with the received updated information so as for future usage.

By providing the method and the system for updating security information in accordance with the present invention, merits of both the active push transmission and the passive pull transmission can be obtained. For example, the advantages from the active push transmission for updating the security information include: applicability to the online MD, real-time transmission, reduced bandwidth for MD's uploading, reduction in system's internal information flow, reduction loading upon the SS and the DP, simultaneous transmission of the similar information to various MDs, and capability of serving a big number of MDs. On the other hand, the advantages from the passive pull transmission for updating the security information include: applicability to various on-demand MDs, the swiftness of obtaining the required specific information, and relevance for updating time-varying information. Thus, it is obvious that the method and the system for updating security information in accordance with the present invention are superior to the related technique in the art.

While the present invention has been particularly shown and described with reference to a preferred embodiment, it will be understood by those skilled in the art that various changes in form and detail may be without departing from the spirit and scope of the present invention.

What is claimed is:

1. A method for updating security information, applied to an information service provider, the information service provider including a server computer and a database, the server computer providing at least one security information to at least one distant mobile device, each of the at least one security information being related individually to a security code; the method for updating security information comprising the steps of: Step (A): the server computer storing internally an information definition table, the information definition table including a plurality of information names, each of the information names being respectively related to an information code and an information-processing time contained in the information definition table, the information name being an information format of the security information, the information code being respectively related to a code number of the corresponding information name, the information-processing time indicating a download time to download the security information of the corresponding information name; Step (B): according to the information definition table and within the download time indicated by the information-processing time in the information definition table, the server computer downloading the information name corresponding to the information-processing time or every said security information matching the information code from a foreign information source, then storing each of the downloaded security information into the database, and updating a plurality of information updating tables pre-stored in the database accordingly, wherein each the security code is correspondingly related to one of the information updating tables stored in the database, and each of the corresponding information updating tables records every said information code of the security information and a previous update time related to the corresponding security code; Step (C): according to the plurality of information updating tables, the server computer generating an information-transmitting schedule accounting to the individual security code corresponding to each said updated security information, the information-transmitting schedule including a transmission time related to the security code, an information-starting date and an information-ending date related both to the corresponding information code; wherein a time duration between the information-starting date and the information-ending date is defined as a previous-updated period for the security information related to the information code of the security code; and Step (D): during the transmission time included in the information-transmitting schedule, the server computer transmitting the corresponding security information within the previous-updated period to each of the at least one mobile device connected with the server computer during the transmission time.

2. The method for updating security information of claim 1, wherein an application program is performed at the mobile device, a personal profolio is stored in the mobile device, the personal profolio includes at least one said security code configured by a user of the corresponding mobile device, the personal profolio is also stored in the database, and the security code contained in the personal profolio is further related individually to one of the information updating tables and one of the information-transmitting schedules stored in the mobile device; wherein: in the Step (B), after the server computer updates any said information updating table of the security code, a comparison upon the personal profolio is performed between the server computer and each of the at least one mobile device so as to transmit the updated information updating table of the common security code to the respective mobile device; the application program performed at the mobile device then updates the corresponding information updating table stored in the mobile device accordingly; in the Step (C), after the server computer generates the information-transmitting schedule of any said security code, a comparison upon the personal profolio is performed between the server computer and each of the at least one mobile device so as to transmit the updated information-transmitting schedule of the common security code to the respective mobile device; the application program performed at the mobile device then updates the corresponding information-transmitting schedule stored in the mobile device accordingly; and, in the Step (D), during the transmission time, the application program performed at the mobile device bases on the information updating table and the information-transmitting schedule stored in the mobile device to establish automatically connection with the server computer so as to receive the security information from the server computer.

3. The method for updating security information of claim 1, wherein, when a user operates the mobile device to display a desired information, the application program performed at the mobile device bases on user's operations and the information updating table stored in the mobile device to determine if or not a connection with the server computer is needed to obtain a desired updated information; if the connection is needed, the connection being established so as to transmit an information-pulling request to the server computer after the server computer receiving the information-pulling request from the mobile device, the related updated information being retrieved from the database and further transmitted to the mobile device; the mobile device storing the received updated information into a memory of the mobile device, displaying the desired information on the mobile device, and further updating the information updating table stored in the mobile device that is related to the updated information.

4. The method for updating security information of claim 1, wherein the server computer includes a data collector (DC), a data scheduler (DL), a data disseminator (DD), a data cacher (DA), a memory cache (MC), a service server computer (SS) and a data puller (DP); wherein the data collector (DC) capable of connecting a foreign information source (data source, DS) is to collect various security information and further to process and transform into a predetermined format before being stored into the database (DB); wherein the database (DB) stores at least the security information; wherein, after reading and further processing information from the database (DB) at predetermined times, the data scheduler (DL) generates, then stores into the database (DB) and forwards to the related mobile device (MD) the related information updating tables and the related information-transmitting schedules; wherein the data disseminator (DD) bases on the information-transmitting schedules stored in the database (DB) by the data scheduler (DL) to read at predetermined times related information and then transmit the related information to the related user for following processing; wherein, after receiving the information from the data scheduler (DL) and the data disseminator (DD), the data cacher (DA) processes the information and then stores into the memory cache (MC); wherein the memory cache (MC) stores the information of the data cacher (DA) for further requirement in the data puller (DP); wherein the service server computer (SS) provides network connections and information transmissions related to various cloud-end service server computers that provide updating service to the mobile device (MD); wherein, after analyzing an information-updating 30 order from the service server computer (SS), the data puller (DP) obtains the security information for the mobile device (MD) from the memory cache (MC) and then transmits the security information back to the service server computer (SS) and further the mobile device (MD).

5. A system for updating security information, comprising: at least one mobile device; and an information service provider, including a server computer and a database, the server computer providing at least one security information to at least one distant mobile device, each of the at least one security information being related individually to a security code; the information service provider being capable of performing a method for updating security information, the method for updating security information comprising the steps of: Step (A): the server computer storing internally an information definition table, the information definition table including a plurality of information names, each of the information names being respectively related to an information code and an information-processing time contained in the information definition table, the information name being an information format of the security information, the information code being respectively related to a code number of the corresponding information name, the information-processing time indicating a download time to download the security information of the corresponding information name; Step (B): according to the information definition table and within the download time indicated by the information-processing time in the information definition table, the server computer downloading the information name corresponding to the information-processing time or every said security information matching the information code from a foreign information source, then storing each of the downloaded security information into the database, and updating a plurality of information updating tables pre-stored in the database accordingly, wherein each the security code is correspondingly related to one of the information updating tables stored in the database, and each of the corresponding information updating tables records every said information code of the security information and a previous update time related to the corresponding security code; Step (C): according to the plurality of information updating tables, the server computer generating an information-transmitting schedule accounting to the individual security code corresponding to each said updated security information, the information-transmitting schedule including a transmission time related to the security code, an information-starting date and an information-ending date related both to the corresponding information code; wherein a time duration between the information-starting date and the information-ending date is defined as a previous-updated period for the security information related to the information code of the security code; and Step (D): during the transmission time included in the information-transmitting schedule, the server computer transmitting the corresponding security information within the previous-updated period to each of the at least one mobile device connected with the server computer during the transmission time.

6. The system for updating security information of claim 5, wherein an application program is performed at the mobile device, a personal profolio is stored in the mobile device, the personal profolio includes at least one said security code configured by a user of the corresponding mobile device, the personal profolio is also stored in the database, and the security code contained in the personal profolio is further related individually to one of the information updating tables and one of the information-transmitting schedules stored in the mobile device; wherein: in the Step (B), after the server computer updates any said information updating table of the security code, a comparison upon the personal profolio is performed between the server computer and each of the at least one mobile device so as to transmit the updated information updating table of the common security code to the respective mobile device; the application program performed at the mobile device then updates the corresponding information updating table stored in the mobile device accordingly; in the Step (C), after the server computer generates the information-transmitting schedule of any said security code, a comparison upon the personal profolio is performed between the server computer and each of the at least one mobile device so as to transmit the updated information-transmitting schedule of the common security code to the respective mobile device; the application program performed at the mobile device then updates the corresponding information-transmitting schedule stored in the mobile device accordingly; and, in the Step (D), during the transmission time, the application program performed at the mobile device bases on the information updating table and the information-transmitting schedule stored in the mobile device to establish automatically connection with the server computer so as to receive the security information from the server computer.

7. The system for updating security information of claim 5, wherein, when a user operates the mobile device to display a desired information, the application program performed at the mobile device bases on user's operations and the information updating table stored in the mobile device to determine if or not a connection with the server computer is needed to obtain a desired updated information; if the connection is needed, the connection being established so as to transmit an information-pulling request to the server computer after the server computer receiving the information-pulling request from the mobile device, the related updated information being retrieved from the database and further transmitted to the mobile device; the mobile device storing the received updated information into a memory of the mobile device, displaying the desired information on the mobile device, and further updating the information updating table stored in the mobile device that is related to the updated information.

8. The system for updating security information of claim 5, wherein the server computer includes a data collector (DC), a data scheduler (DL), a data disseminator (DD), a data cacher (DA), a memory cache (MC), a service server computer (SS) and a data puller (DP); wherein the data collector (DC) capable of connecting a foreign information source (data source, DS) is to collect various security information and further to process and transform into a predetermined format before being stored into the database (DB); wherein the database (DB) stores at least the security information; wherein, after reading and further processing information from the database (DB) at predetermined times, the data scheduler (DL) generates, then stores into the database (DB) and forwards to the related mobile device (MD) the related information updating tables and the related information-transmitting schedules; wherein the data disseminator (DD) bases on the information-transmitting schedules stored in the database (DB) by the data scheduler (DL) to read at predetermined times related information and then transmit the related information to the related user for following processing; wherein, after receiving the information from the data scheduler (DL) and the data disseminator (DD), the data cacher (DA) processes the information and then stores into the memory cache (MC); wherein the memory cache 30 (MC) stores the information of the data cacher (DA) for further requirement in the data puller (DP); wherein the service server computer (SS) provides network connections and information transmissions related to various cloud-end service server computers that provide updating service to the mobile device (MD); wherein, after analyzing an information-updating order from the service server computer (SS), the data puller (DP) obtains the security information for the mobile device (MD) from the memory cache (MC) and then transmits the security information back to the service server computer (SS) and further the mobile device (MD).

* * * * *